United States Patent
Weis et al.

[15] 3,687,996
[45] Aug. 29, 1972

[54] PROCESS FOR THE PRODUCTION OF OCTAHYDRO-1,2,4-METHENOPENTALENYL-(5)EXO-ISOCYANATE

[72] Inventors: Claus Dieter Weis, 43, Hotmattweg, Arlesheim, Basel, Switzerland; Alain Claude Rochat, 21, Bettingerstrasse, Birsfelden near Basel, Switzerland

[73] Assignee: Ciba-Geigy Corporation, Ardsley, N.Y.

[22] Filed: June 16, 1969

[21] Appl. No.: 833,773

[52] U.S. Cl. .........260/453 P, 260/349, 260/453 AP, 260/468 B, 260/468 C, 260/514 B, 260/553 A, 260/553 D, 260/553 R, 260/557 B, 260/563 P, 260/999
[51] Int. Cl. .........................................C07c 119/04
[58] Field of Search............260/453 A, 453 P, 557 H

[56] References Cited

UNITED STATES PATENTS 3,209,026    9/1965    Finkelstein et al.....260/453 X

OTHER PUBLICATIONS

Dietrich: Chemical Abstracts, vol. 70, 67907q, March (1969).
Weis: Chemical Abstracts, Vol. 70, 87146u (May–1969).

*Primary Examiner*—Joseph Rebold
*Assistant Examiner*—Dolph H. Torrence
*Attorney*—Karl F. Jorda and Frederick H. Rabin

[57] ABSTRACT

Novel process for the preparation of octahydro-1,2,4-methenopentalenyl-(5)exo-isocyanate comprising reacting an exo-endo isomer mixture consisting substantially of the exo isomer of a lower alkoxyalkyl octahydro-1,2,4-methenopentalene-5-carboxylate with hydrazine to obtain the corresponding carboxylic acid-hydrazide, freeing this of the endo isomer content by recrystallization from lower haloalkanes, then converting the acid hydrazide thus purified, with nitrous acid into the acid azide and decomposing this with heat.

6 Claims, No Drawings

PROCESS FOR THE PRODUCTION OF OCTAHYDRO-1,2,4-METHENOPENTALENYL-(5)EXO-ISOCYANATE

SUMMARY OF THE INVENTION

The present invention concerns a process for the production of pure octahydro-1,2,4-methenopentalenyl-(5)exo-isocyanate, a compound which is important in the production of pharmaceuticals, biocidal substances and other chemicals. The processes known hitherto for the production of cycloaliphatic isocyanates are not practicable for octahydro-1,2,4-methenopentalenyl-(5)isocyanate. Isomers are obtained which are extremely difficult to separate. Even if such a separation can be effected, it is technically very troublesome and the yields are often small. For the production of pharmaceuticals, isomerically pure intermediate products are desirable. It was therefore important to develop a simple process for the production and separation of octahydro-1,2,4-methenopentalenyl-(5)isocyanate of the formula

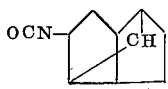

as a homogenous product.

DETAILED DESCRIPTION OF THE INVENTION

Octahydro-1,2,4-methenopentalenyl-(5)exo-isocyanate is produced according to the invention by reacting an exo-endo isomer mixture consisting substantially of the exo isomer of a lower alkoxyalkyl octahydro-1,2,4-methenopentalene-5-carboxylate with hydrazine to obtain the corresponding carboxylic acid-hydrazide, freeing this of the endo isomer content by recrystallization from lower haloalkanes, then converting the acid hydrazide thus purified, with nitrous acid into the acid azide and decomposing this with heat.

Suitable starting materials for the process according to the invention are the following lower alkoxyalkyl esters of octahydro-1,2,4-methenopentalene-5-carboxylic acid: β-methoxy-ethyl ester, β-ethoxyethyl ester, β-n-propoxyethyl ester, β-isopropoxyethyl ester, β-n-butoxyethyl ester, γ-methoxy-propyl ester, γ-ethoxy-propyl ester, γ-n-propoxy-propyl ester, γ-isopropoxy-propyl ester and γ-n-butoxy-propyl ester. It is important that only esters containing a substantial portion of the exo isomer are used as starting materials. Such esters are obtained by a continual process, reacting 2,5-norbornadiene with appropriate acrylic acid-lower alkoxyalkyl esters in the presence of nickel(O) catalysts at 150° to 200°C. Of those listed, the β-ethoxyethyl ester is the most suitable. It is reactive and is easily converted to the desired hydrazide. It is true that the methyl esters known from U.S. Pat. No. 3,271,438 and the ethyl esters known from the German specification open to public inspection No. 1,186,052, are also easily reacted with hydrazine giving good yields; both of these esters, however, have such a penetrating intrinsic smell ([G.N. Schrauzer et al., Ber. 95, 2768 (1962)], that it is almost impossible to work with them. Even traces of these esters are considerably disturbing during the subsequent reactions. Octahydro-1,2,4-methenopentalene-5-carboxylic acid also has a very strong intrinsic smell. The alkoxyalkyl esters suitable for the process according to the invention are practically odorless and are not very sensitive to hydrolysis, so that no carboxylic acid is formed, since even traces thereof could be detected by its extremely unpleasant smell. It is expedient to use hydrazine hydrate instead of hydrazine, since it is easier to handle. The reaction of the carboxylic acid ester with hydrazine or hydrazine hydrate is performed in the presence of organic solvents which are inert towards the reaction components, preferably in the alkoxyalkanol corresponding to the alkoxyalkyl ester employed.

The hydrazide is obtained in this step as an isomer mixture containing a very high proportion of exo isomer. By recrystallization from lower haloalkanes, the endo isomer is removed. The exo-hydrazide is crystalline, while the endo isomer is obtained as an oil. The mixture is dissolved in a boiling haloalkane and then chilled by placing it in ice. It is advisable to leave the solution in the icebath only a few minutes. By prolonged cooling the greater portion of the endo isomer crystallizes as well as the exo isomer and the recrystallization must then be repeated several times. The purity of the exo-hydrazide was determined by nuclear resonance spectra. Suitable lower haloalkanes are, in particular, chlorinated ethanes. After recrystallization once or twice with 1,2-dichloroethane, completely isomerically pure exo-hydrazine was obtained.

The exo-hydrazide is then converted with nitrous acid to the azide. The nitrous acid is preferably produced from an aqueous solution of alkali metal nitrite and hydrogen chloride. In order to avoid undesirable side reactions, it is best to use a mixture of an organic solvent and water. It is preferable to use a two phase system, the reaction taking place in the aqueous phase thereof and the azide which forms being constantly extracted therefrom by the organic phase. Suitable organic solvents are those in which both the azide and the isocyanate are easily soluble. For this purpose aliphatic and aromatic hydrocarbons, higher boiling ethers, etc. can be used; preferred is the use of higher boiling alkanes and cycloalkanes, particularly cyclohexane. To avoid other side reactions, the acidity of the reaction mixture must be high, on the other hand the hydrazine/hydrochloride concentration must be low. For this reason, the solvent mixture and hydrochloric acid are first put into the reaction vessel, then the hydrazide/hydrochloride solution and the nitrite solution are simultaneously added in stoichiometrical amounts. The addition of the two solutions must be regulated in such a manner that the temperature of the reaction mixture does not exceed 10°C. After completion of the reaction, the organic phase, in which the azide is dissolved, is separated and dried. To decompose the azide, this solution is slowly and carefully heated to the boiling point of the solvent employed; heating is continued until no more nitrogen develops. The solvent is then removed and the residue is fractionated in vacuo. According to the process according to the invention, the octahydro-1,2,4-methenopentalenyl-(5)exo-isocyanate is obtained in yields of from 70 to 80 percent of the theoretical, calculated on exo-hydrazide.

This isocyanate can be reacted with various amines and amides to obtain urea derivatives, some of which have excellent pharmacological properties, others are excellent herbicidal and pesticidal active substances.

Thus, for example, from the said exo-isocyanate and arylsulfonamides, the corresponding 1-arylsulfonyl-3-[octahydro-1,2,4-methenopentalenyl-(5)]ureas are obtained, e.g., 1-(p-tolylsulfonyl)-3-[octahydro-1,2,4-methenopentalenyl-(5)]urea; from the exo-isocyanate and primary or secondary aliphatic amines or arylamines important herbicides, and from exo-isocyanate and oximes important pesticides are obtained. By reacting with alkanols, carbamic acid esters, and with acetic acid and acetic acid anhydride, the acetyl amine are obtained. The The carbamic acid esters and the acetyl amine can be easily hydrolyzed to octahydro-1,2,4-methenopentalenyl-(5) exo-amine (boiling point: 75°–77a$LC$ 11 Torr, refractive index $n_D^{20}$: 1.5186), which has a superior antiviral action.

The following example illustrates the process according to the invention; temperatures are given in degrees centigrade.

EXAMPLE a. 1000 g of hydrazinehydrate and 90 g of 2-ethoxyethanol are heated in a sulfonator to 115° and treated dropwise during 5 hours with vigorous stirring with 2360 g of β-ethoxyethyl octahydro-1,2,4-methenopentalene-5-carboxylate (isomer mixture endo:exo 1:9). The reaction mixture is then refluxed for 10 hours, the greater part of the unreacted hydrazine-hydrate, water and solvent are removed by distillation (normal pressure) and the residue is added to a mixture of ice and water (1:2). After stirring for 2 hours, the precipitate is removed by filtration, washed with icewater and dried under vacuum for 24 hours. The crude hydrazide has a melting point of 74° – 96° and is an isomer mixture consisting essentially of the exo isomer. The yield of crude exo-hydrazide is 87 percent of the theoretical.

b. 178 g of the hydrazide obtained according to a) are dissolved in 1780 ml of boiling 1,2-dichloroethane. The solution is then cooled to 0° and kept for several minutes at this temperature. The precipitate obtained is separated. The octahydro-1,2,4-methenopentalene-5-exo-carboxylic acid-hydrazide has a melting point of 126° and the nuclear resonance spectrum shows no impurification by endo isomer. The yield is 98 g (60 percent).

c. From 178 g of octahydro-1,2,4-methenopentalene-5-exo-carboxylic acid-hydrazide, 130 ml of water and 140 g of concentrated hydrochloric acid, the solution of the corresponding hydrazide-hydrochloride is obtained. The solution is added simultaneously with a solution of 170 ml of water and 85 g of sodium nitrite, while stirring vigorously at 0° to 5°, to a mixture of 600 ml of water, 160 g of concentrated hydrochloric acid and 625 g of cyclohexane. The addition of the two liquids is so regulated that 2 parts by volume of the hydrazide/hydrochloride solution corresponds to 1 part by volume of the nitrite solution and the temperature of the reaction mixture does not exceed 10°. After completion of the addition, the mixture is stirred for 30 minutes at 0° and then left to stand. Two layers form: the cyclohexane layer is removed and dried with sodium sulfate, the aqueous layer is thrown away. After filtering, the cyclohexane layer is slowly and carefully heated within 2 hours to 80°. Nitrogen begins to develop at 30° and ceases at 70°. The cyclohexane is then removed by distillation and the residue is fractionated. The octahydro-1,2,4-methenopentalenyl-(5)-exo-isocyanate has a melting point of 45° – 50° at 0.3 Torr. The yield is 121 g (75 percent of the theoretical). The refractive index $n_D^{20} = 1.5056$.

β-Ethoxy-ethyl octahydro-1,2,4-methenopentalene-5-carboxylate used as starting material for the foregoing example is prepared as follows: 3312 g of β-ethoxy-ethyl acrylate, stabilized with 0.2 percent of hydroquinone-monomethyl ether, 1852 g of 2,5-norbornadiene and 148 g of nickel tricarbonyl-triphenyl phosphine are combined. 500 ml of this mixture are heated to 170° in a flask equipped with a discharge until the strongly exothermic reaction commences. As soon as the reaction subsides (lowering of the inner temperature from 180° to 170°C) and the ester/diene/catalyst mixture is added in such a manner that the inner temperature is 170°–180°. Simultaneously, the reaction product, namely β-ethoxy-ethyl octahydro-1,2,4-methenopentalene-5-carboxylate is removed through the discharge. Addition and removal are so regulated that there are constantly 1500 ml of the reaction mixture in the reaction vessel. After 2.5 to 3 hours the reaction of the batch is completed. For purification, the ester is fractionated in vacuo; its boiling point is 115° at 0.5 Torr (uncorrected), and 100° at 0.005 Torr and its refractive index $n_D^{20} = 1.4833$.

We claim:

1. A process for the production of octahydro-1,2,4-methenopentalenyl(5)exo-isocyanate comprising the steps of (1) heating an exo-endo isomer mixture of a lower alkoxy lower alkyl octahydro-1,2,4-methenopentalene-5-carboxylate, wherein the ratio of exo isomer to endo isomer is about 9:1, with hydraxine in an inert organic solvent to obtain the corresponding carboxylic acid hydrazide, (2) recrystallizing the carboxylic acid hydrazide from a chlorinated ethane, thereby freeing the exo isomer of said carboxylic acid hydrazide from its endo isomer, (3) reacting, at a temperature not exceeding 10°C, the exo isomer of the carboxylic acid hydrazide with nitrous acid in a two-phase solvent system consisting essentially of a high boiling organic solvent and water, the nitrous acid being formed in situ by the reaction of an alkali metal nitrate and hydrogen chloride, thereby converting the hydrazide to the corresponding azide which enters the organic solvent phase, and (4) decomposing the azide by heating the organic solvent phase until the evolution of nitrogen ceases.

2. A process as described in claim 1 wherein the solvent in step (1) is the alkoxyalkanol which corresponds to the alkoxyalkyl ester.

3. A process as described in claim 1 wherein the starting isomer mixture is that of β-ethoxy-ethyl octahydro-1,2,4-methenopentalene-5-carboxylate.

4. The process as described in claim 3 in which the temperature in step (1) is about 115°C.

5. A process as described in claim 1 wherein the chlorinated ethane used in step (2) is 1,2-dichloroethane.

6. The process as described in claim 1 in which the organic solvent used in step (3) is cyclohexane.

* * * * *

PO-1050
(5/69)

UNITED STATES PATENT OFFICE
CERTIFICATE OF CORRECTION

Patent No. 3,687,996      Dated August 29, 1972

Inventor(s) Claus Dieter Weis and Alain Claude Rochat

It is certified that error appears in the above-identified patent and that said Letters Patent are hereby corrected as shown below:

The following material should be added on the cover page of the patent in the left-hand column:

[32] Priority    June 20, 1968
    [33]                Switzerland
    [34]                9213/68

Signed and sealed this 1st day of May 1973.

(SEAL)
Attest:

EDWARD M. FLETCHER, JR.        ROBERT GOTTSCHALK
Attesting Officer                Commissioner of Patents